United States Patent
Kim et al.

(10) Patent No.: US 10,397,031 B2
(45) Date of Patent: Aug. 27, 2019

(54) METHOD OF PROCESSING COMPRESSIVE SENSING SIGNAL AND APPARATUS FOR SAME

(71) Applicant: ELECTRONICS AND TELECOMMUNICATIONS RESEARCH INSTITUTE, Daejeon (KR)

(72) Inventors: Yoo Kyung Kim, Daejeon (KR); Jae Hyuck Park, Daejeon (KR); Seong Hyun Kim, Seoul (KR)

(73) Assignee: ELECTRONICS AND TELECOMMUNICATIONS RESEARCH INSTITUTE, Daejeon (KR)

(*) Notice: Subject to any disclaimer, the term of this patent is extended or adjusted under 35 U.S.C. 154(b) by 0 days.

(21) Appl. No.: 16/128,271

(22) Filed: Sep. 11, 2018

(65) Prior Publication Data
US 2019/0116074 A1    Apr. 18, 2019

(30) Foreign Application Priority Data
Oct. 17, 2017    (KR) .................. 10-2017-0134711

(51) Int. Cl.
 *H04B 1/16* (2006.01)
 *H04L 27/148* (2006.01)
(52) U.S. Cl.
 CPC ............. *H04L 27/148* (2013.01); *H04B 1/16* (2013.01)

(58) Field of Classification Search
 CPC ................................. H04L 27/148; H04B 1/16
 See application file for complete search history.

(56) References Cited

U.S. PATENT DOCUMENTS

| | | | |
|---|---|---|---|
| 8,774,294 B2 | 7/2014 | Shental et al. | |
| 8,861,588 B2* | 10/2014 | Nguyen | G01S 13/90 341/155 |
| 2002/0057213 A1* | 5/2002 | Heath | H03M 7/3088 341/51 |
| 2014/0126611 A1 | 5/2014 | Bang et al. | |
| 2015/0237407 A1 | 8/2015 | Lee et al. | |

OTHER PUBLICATIONS

Zhengli Xing et al., "A Novel Compressed Sensing Based Model for Reconstructing Sparse Signals Using Phase Sparse Character", Elektronika Ir Elektrotechnika, 2014.

* cited by examiner

*Primary Examiner* — Nguyen T Vo

(57) ABSTRACT

Disclosed is a method of receiving a compressive sensing signal and an apparatus for the same. According to an embodiment of the present disclosure, the method includes: receiving a signal processed using a predetermined dictionary set and a first sampling rate for each symbol group including one or more symbols; performing analog-to-digital conversion on the received signal at a second sampling rate that is lower than the first sampling rate; checking compressed measurement information from the signal on which analog-to-digital conversion is performed; and reconstructing values of the symbols included in the symbol group, which correspond to the compressed measurement information, on the basis of the predetermined dictionary set.

10 Claims, 6 Drawing Sheets

METHOD OF PROCESSING COMPRESSIVE SENSING SIGNAL AND APPARATUS FOR SAME

CROSS REFERENCE TO RELATED APPLICATION

The present application claims priority to Korean Patent Application No. 10-2017-0134711, filed Oct. 17, 2017, the entire contents of which are incorporated herein for all purposes by this reference.

BACKGROUND OF THE INVENTION

Field of the Invention

The present disclosure relates generally to wireless communication technology. More particularly, the present disclosure relates to a method of transmitting/receiving a compressive sensing signal and an apparatus for the same.

Description of the Related Art

In order to analyze causes of wireless communication problems and to solve the problems, signal recording for a received signal (namely, a radio frequency (RF) signal) is used. To store broadband signals corresponding to a subsequent amount of data, high-performance hardware equipment supporting high sampling rates, especially, an analog-to-digital converter (ADC) capable of operating at a high sampling rate, a high-performance digital processor capable of quickly performing operation processing of highly sampled data, a high-capacity storage medium, and the like are required.

Although signal recording is indispensable for operation of a wireless communication system, building such high-performance hardware equipment is very costly and it is difficult to manage massive amounts of data.

The foregoing is intended merely to aid in the understanding of the background of the present disclosure, and is not intended to mean that the present disclosure falls within the purview of the related art that is already known to those skilled in the art.

SUMMARY OF THE INVENTION

Accordingly, the present disclosure has been made keeping in mind the above problems occurring in the related art, and the present disclosure is intended to propose a method of processing a compressive sensing signal and an apparatus for the same, the method and apparatus being capable of reducing an amount of data required for signal recording by processing the compressive sensing signal.

It is to be understood that the technical problems to be solved by the present disclosure are not limited to the aforementioned technical problems, and other technical problems which are not mentioned herein will be apparent from the following description to a person of ordinary skill in the art to which the present disclosure pertains.

In order to achieve the above object, according to one aspect of the present disclosure, there is provided a method of processing a compressive sensing signal, the method including: receiving a signal processed using a predetermined dictionary set and a first sampling rate for each symbol group including one or more symbols; performing analog-to-digital conversion on the received signal at a second sampling rate that is lower than the first sampling rate; checking compressed measurement information from the signal on which analog-to-digital conversion is performed; and reconstructing values of the symbols included in the symbol group, which correspond to the compressed measurement information, on the basis of the predetermined dictionary set.

According to another aspect of the present disclosure, there is provided an apparatus for processing a compressive sensing signal, the apparatus including: a signal reception unit receiving a signal processed using a predetermined dictionary set and a first sampling rate for each symbol group including one or more symbols; an ADC unit performing analog-to-digital conversion on the received signal at a second sampling rate that is lower than the first sampling rate; a compressed measurement information detection unit checking compressed measurement information from the signal on which analog-to-digital conversion is performed; and a compressive sensing signal reconstruction unit reconstructing values of the symbols included in the symbol group, which correspond to the compressed measurement information, on the basis of the predetermined dictionary set.

It is to be understood that the foregoing summarized features are exemplary aspects of the following detailed description of the present disclosure without limiting the scope of the present disclosure.

According to the present disclosure, the method and apparatus that are capable of dramatically reducing the amount of data required for signal recording by processing the compressive sensing signal are provided.

The effects that may be obtained from the present disclosure will not be limited only to the above-described effects. In addition, other effects which are not described herein will become apparent to those skilled in the art from the following description.

BRIEF DESCRIPTION OF THE DRAWINGS

Hereinbelow, exemplary embodiments of the present disclosure will be described in detail with reference to the accompanying drawings such that the present disclosure can be easily embodied by one of ordinary skill in the art to which this invention belongs. However, the present disclosure may be variously embodied, without being limited to the exemplary embodiments.

In the description of the present disclosure, the detailed descriptions of known constitutions or functions thereof may be omitted if they make the gist of the present disclosure unclear. Also, portions that are not related to the present disclosure are omitted in the drawings, and like reference numerals designate like elements.

In the present disclosure, when an element is referred to as being "coupled to", "combined with", or "connected to" another element, it may be connected directly to, combined directly with, or coupled directly to another element or be connected to, combined directly with, or coupled to another element, having the other element intervening therebetween. Also, it should be understood that when a component "includes" or "has" an element, unless there is another opposite description thereto, the component does not exclude another element but may further include the other element.

In the present disclosure, the terms "first", "second", etc. are only used to distinguish one element, from another element. Unless specifically stated otherwise, the terms "first", "second", etc. do not denote an order or importance. Therefore, a first element of an embodiment could be termed a second element of another embodiment without departing from the scope of the present disclosure. Similarly, a second element of an embodiment could also be termed a first element of another embodiment.

In the present disclosure, components that are distinguished from each other to clearly describe each feature do not necessarily denote that the components are separated. That is, a plurality of components may be integrated into one hardware or software unit, or one component may be distributed into a plurality of hardware or software units. Accordingly, even if not mentioned, the integrated or distributed embodiments are included in the scope of the present disclosure.

In the present disclosure, components described in various embodiments do not denote essential components, and some of the components may be optional. Accordingly, an embodiment that includes a subset of components described in another embodiment is included in the scope of the present disclosure. Also, an embodiment that includes the components described in the various embodiments and additional other components are included in the scope of the present disclosure.

Figure 1:
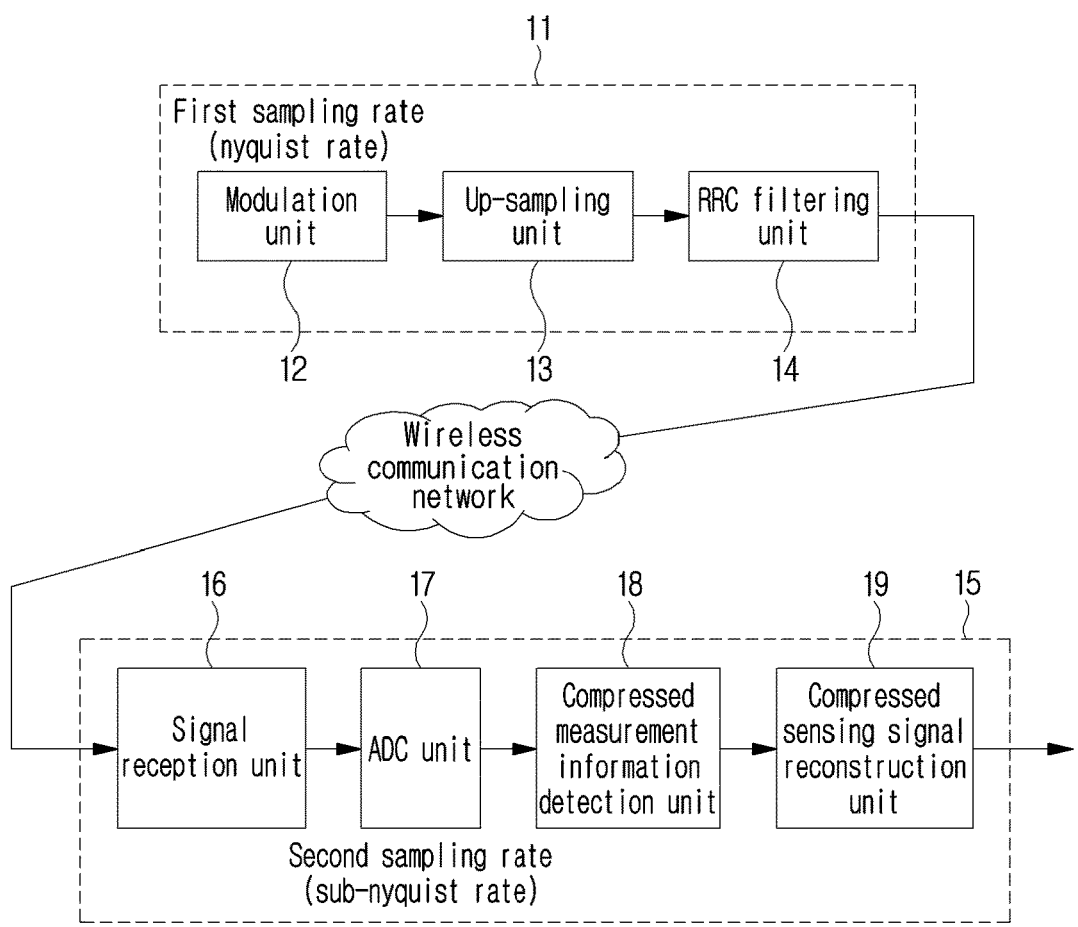
Figure 2:
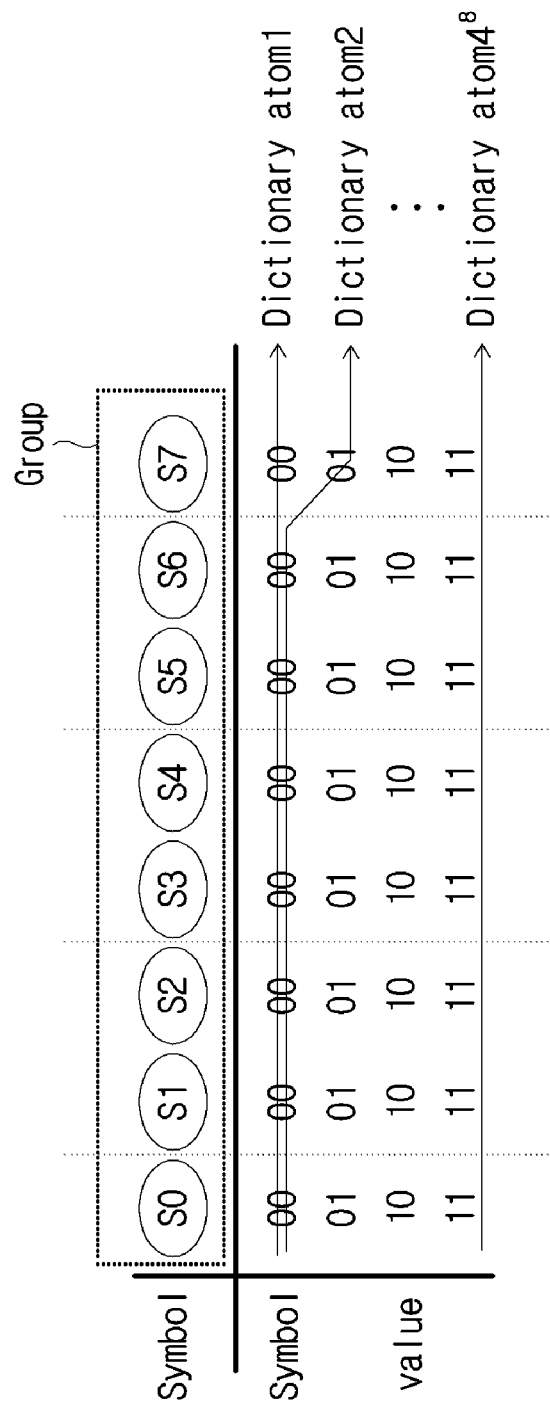
Figure 3:
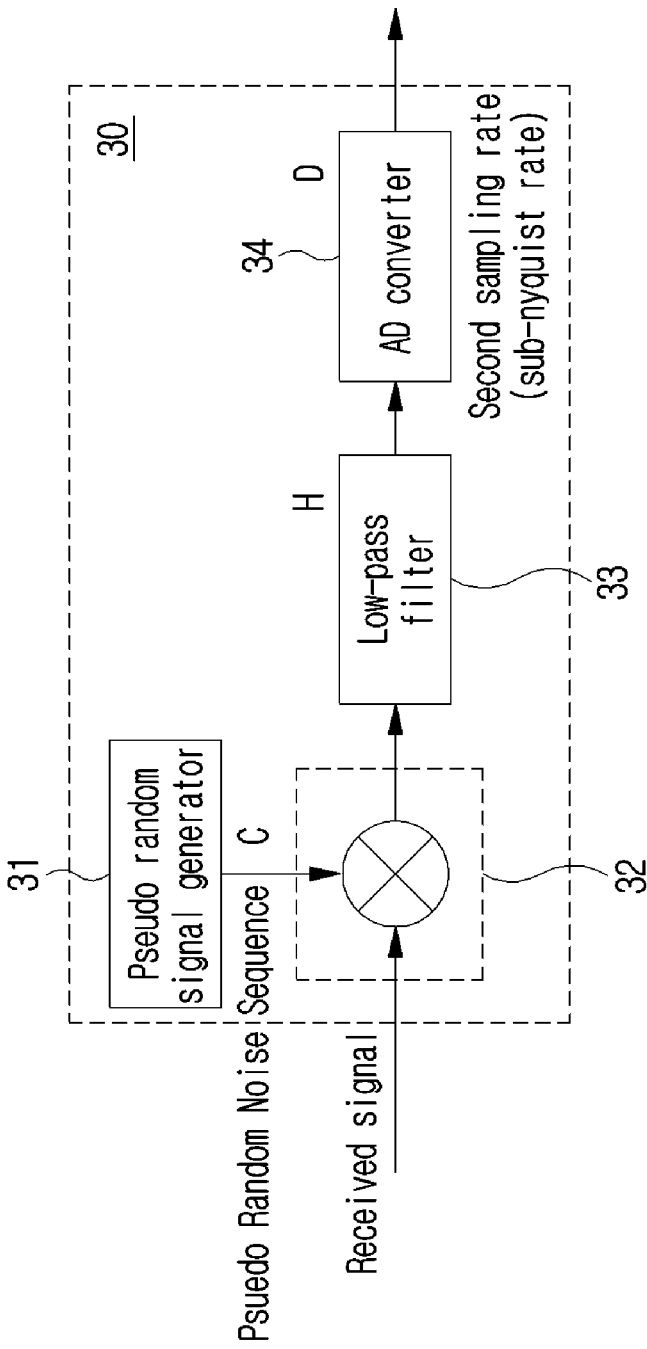
Figure 4:
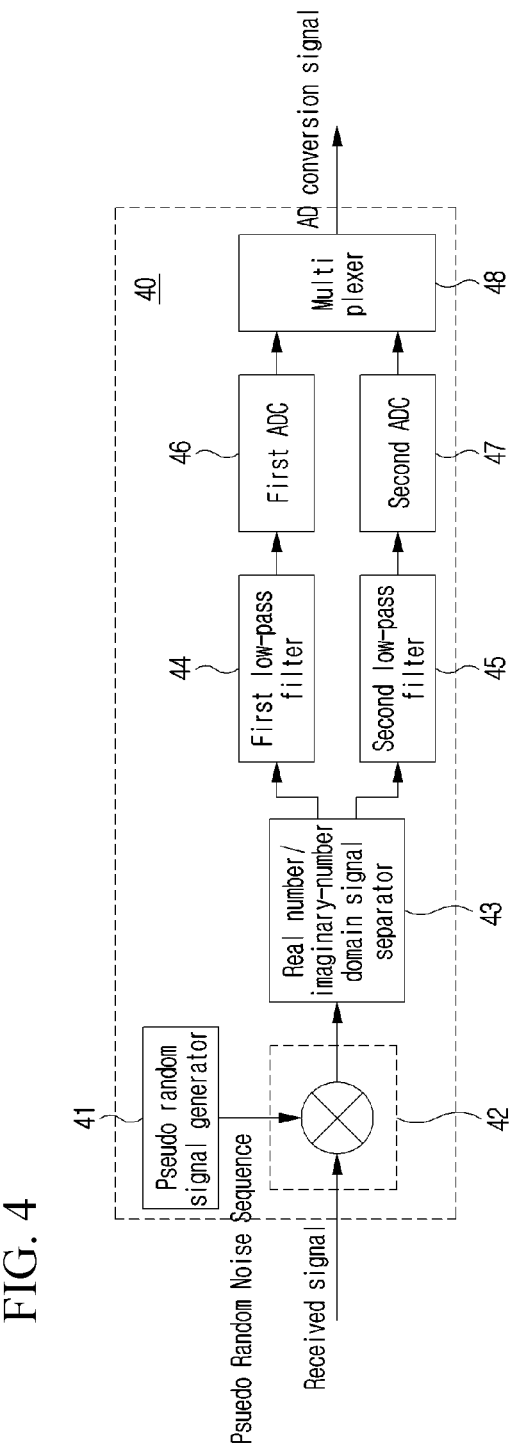
Figure 5:
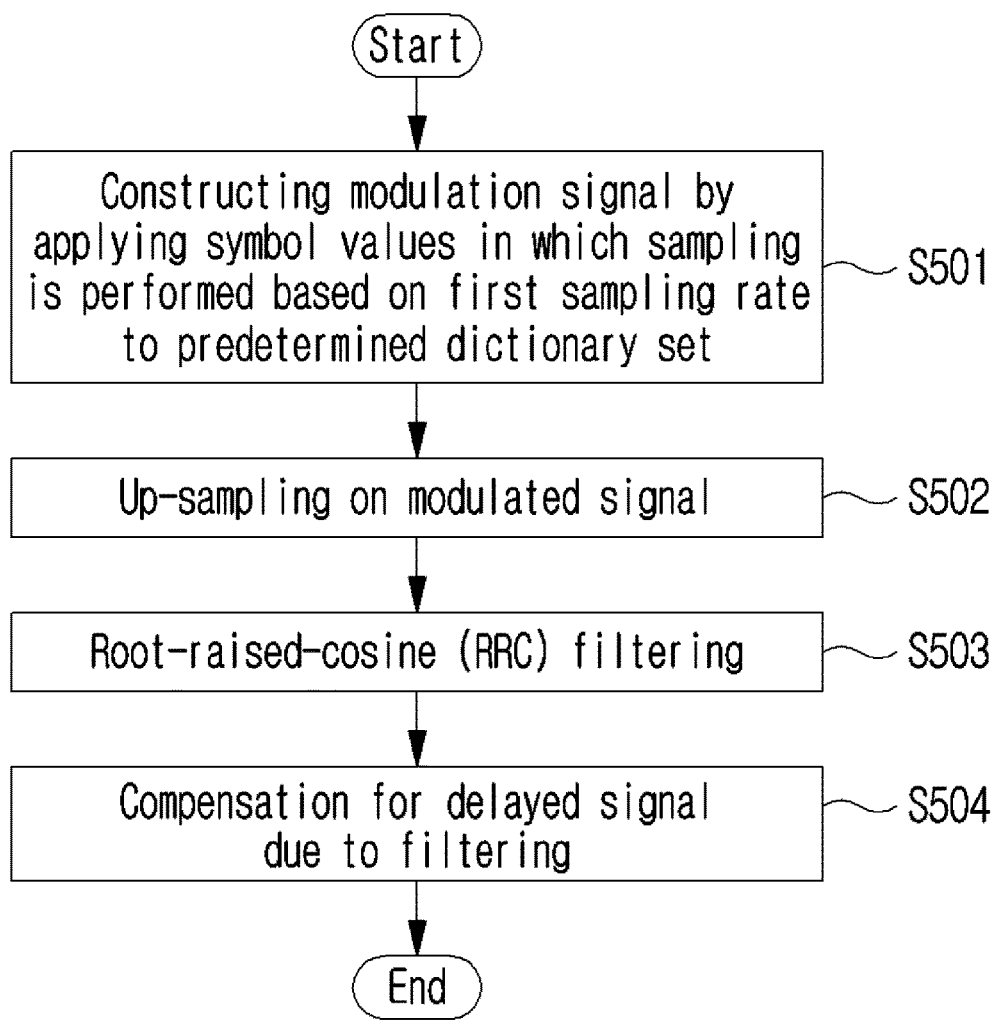
Figure 6:
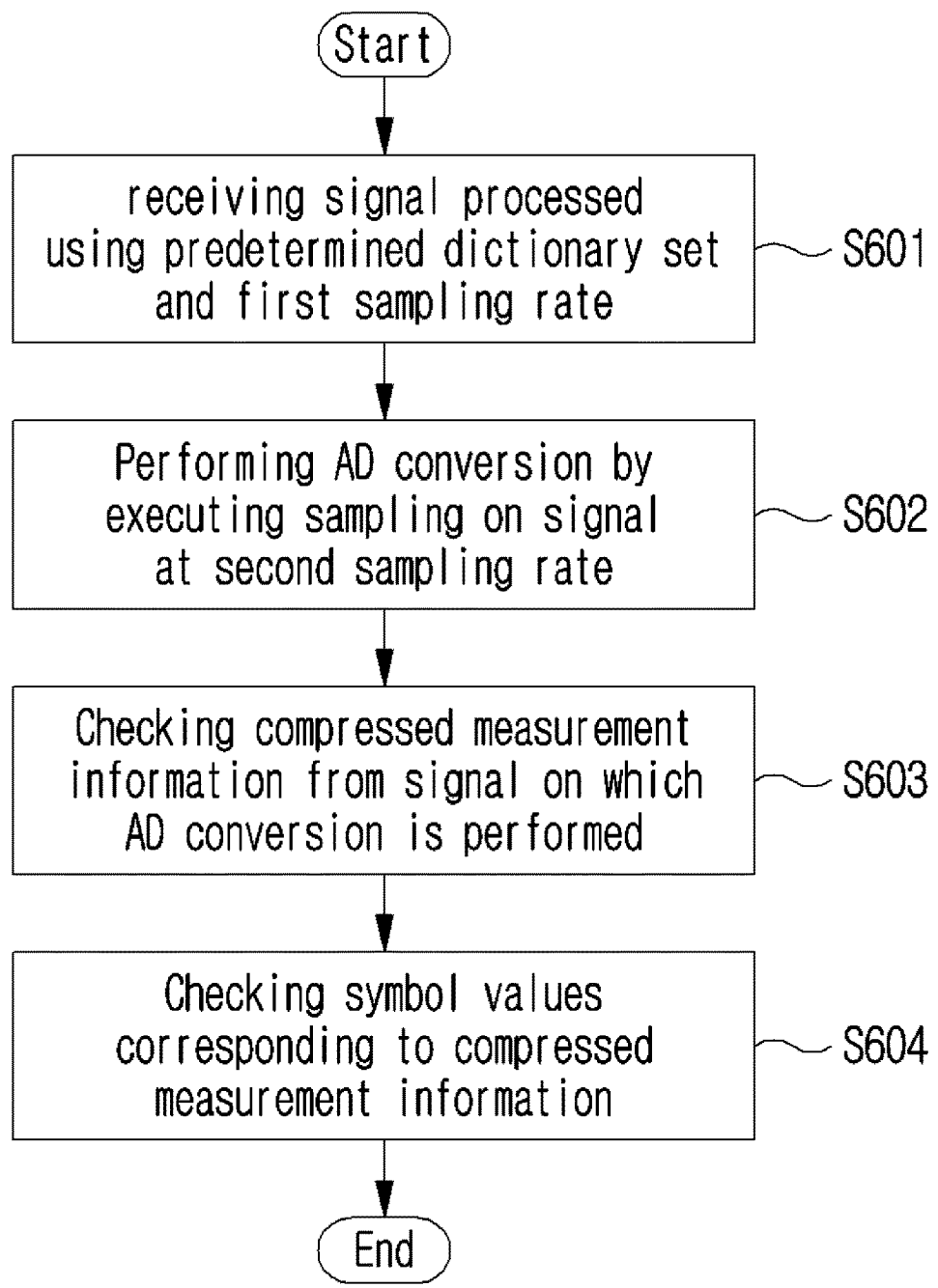

The above and other objects, features and other advantages of the present disclosure will be more clearly understood from the following detailed description when taken in conjunction with the accompanying drawings, in which:

FIG. 1 is a block diagram illustrating a configuration of a system for transmitting/receiving a compressive sensing signal according to an embodiment of the present disclosure;

FIG. 2 is a diagram illustrating an example of a group and values of symbols that are a base for constructing a dictionary set in a system for transmitting/receiving a compressive sensing signal according to an embodiment of the present disclosure;

FIG. 3 is a diagram illustrating in detail an example of a configuration of an ADC unit provided in the apparatus for reception shown in FIG. 1;

FIG. 4 is a diagram illustrating in detail another example of a configuration of an ADC unit provided in the apparatus for reception shown in FIG. 1;

FIG. 5 is a flowchart illustrating a sequence of a method of transmitting a compressive sensing signal according to an embodiment of the present disclosure; and FIG. 6 is a flowchart illustrating a sequence of a method of receiving a compressive sensing signal according to an embodiment of the present disclosure.

DETAILED DESCRIPTION OF THE INVENTION

Hereinbelow, exemplary embodiments of the present disclosure will be described in detail with reference to the accompanying drawings.

FIG. 1 is a block diagram illustrating a configuration of a system for transmitting/receiving a compressive sensing signal according to an embodiment of the present disclosure.

An apparatus 11 for transmission of the system for transmitting/receiving the compressive sensing signal applies symbol values in which sampling is performed on the basis of a first sampling rate (for example, the Nyquist rate) to a predetermined dictionary set and constructs a modulation signal.

Multiple symbols may be set to a single group, and the predetermined dictionary set may be set on a per-group basis. The dictionary set may include multiple dictionary atoms. The dictionary atom may be set in consideration of the number (N, which is a natural number) of symbols provided in the group and the number (M, which is a natural number) of values that may be set as symbol values.

Specifically, the number of dictionary atoms may be set to $M^N$, and each dictionary atom may be set to a combination of values of respective symbols included in the group.

For example, FIG. 2 shows an example in which modulation is performed on a transmission signal in the QPSK scheme and eight symbols S0 to S7 are set to a single group. In this case, each symbol may have values of 00, 01, 10, and 11, and thus the number M of values that may be set as symbol values may be set to four, and the number N of symbols provided in the group may be set to eight. Therefore, the number of dictionary atoms may be set to $4^8$, and each of the dictionary atoms may have a combination of symbol values that may be set for each of the eight symbols S0 to S7. That is, the dictionary atoms may be set to have values ranging from 00 00 00 00 00 00 00 00 to 11 11 11 11 11 11 11 11.

Considering this, the dictionary set may be obtained using the following Equation 1.

$$D = \begin{bmatrix} e+ie & \cdots & -e-ie \\ \vdots & \ddots & \vdots \\ e+ie & \cdots & -e-ie \end{bmatrix}, \qquad \text{[Equation 1]}$$

where $e = \exp(i\pi/M)$

Further, in setting the predetermined dictionary set, the number of symbols included in each group may be set in consideration of an ADC sampling rate of an apparatus for reception.

An apparatus for transmission may construct a transmission signal by performing up-sampling, RRC filtering, compensation for a delayed signal due to filtering, and the like, on the signal modulated using the dictionary set. Conversion of the modulation signal to the transmission signal may be processed using the following Equation 2.

$$\psi = RF_1 UD \qquad \text{[Equation 2]}$$

The transmission signal is designated by $\psi$, an up-sampling processing matrix is designated by U, an RRC filtering processing matrix is designated by $F_1$, a matrix for processing compensation for the delayed signal due to filtering is designated by R, and a matrix for processing signal modulation using the dictionary set is designated by D.

Further, in order to process the above-described operation, the apparatus for transmission may include: a modulation unit 12 performing signal modulation based on the dictionary set; an up-sampling unit 13 performing up-sampling on a modulation signal; and an RRC filtering unit 14 performing RRC filtering and compensation for the delayed signal due to filtering.

In the meantime, the apparatus 15 for reception may include: a signal reception unit 16 receiving a signal (hereinafter, referred to as "a received signal") transmitted from the apparatus for transmission; an ADC unit 17 performing analog-to-digital conversion on the received signal at a second sampling rate which is lower than the first sampling rate; a compressed measurement information detection unit 18 checking compressed measurement information from the signal on which analog-to-digital conversion is performed; and a compressive sensing signal reconstruction unit 19 reconstructing values of multiple symbols, which are included in the symbol group and correspond to the compressed measurement information, on the basis of the predetermined dictionary set.

The ADC unit 17 performs sampling on the signal at the second sampling rate, which is lower than the first sampling rate used in modulation by the apparatus for transmission such that analog-to-digital conversion is performed. For example, when the first sampling rate is set to the Nyquist rate, the second sampling rate is set to the sub-Nyquist rate. For example, the sub-Nyquist rate is set to the Nyquist rate)/W (here, W is a positive integer).

The compressed measurement information detection unit 18 may check compressed measurement information from the signal provided by the ADC unit 17.

As described above, the apparatus for transmission 11 sets the multiple symbols, on which sampling is performed at the first sampling rate, to a group, and transmits a signal corresponding to the dictionary atoms using the predetermined dictionary set for each group. Therefore, the compressed measurement information detected from the received signal may be the signal corresponding to the dictionary atoms included in the predetermined dictionary set for each group.

Considering this, the compressive sensing signal reconstruction unit 19 compares the compressed measurement information with the multiple dictionary atoms included in the predetermined dictionary set and detects a dictionary atom having relatively high similarity. Also, the compressive sensing signal reconstruction unit 19 checks symbol values of respective multiple symbols included in the group using information indicated by the detected dictionary atom.

For example, the compressive sensing signal reconstruction unit 19 may calculate candidate measurement values corresponding to dictionary atoms included in the predetermined dictionary set. Also, the compressive sensing signal reconstruction unit 19 compares the obtained candidate measurement values with the value of the compressed measurement information and detects a candidate measurement value having relatively high similarity. Next, the compressive sensing signal reconstruction unit 19 checks the values indicated by the dictionary atom corresponding to the detected candidate measurement value and maps the values to values of the symbols included in the relevant group, respectively, thereby reconstructing values of the multiple symbols.

In the meantime, FIG. 3 is a diagram illustrating in detail an example of a configuration of an ADC unit provided in the apparatus for reception shown in FIG. 1. Referring to FIG. 3, the ADC unit 30 may include: a pseudorandom signal generator 31 generating a pseudorandom noise signal (a pseudorandom noise sequence); a random signal mixer 32 applying the pseudorandom signal to the received signal and outputting the resulting signal to which the pseudorandom signal is applied; and an AD converter 34 performing analog-to-digital conversion on the resulting signal, to which the pseudorandom signal is applied, at the second sampling rate, and generating an analog-to-digital conversion signal.

The random signal mixer 32 applies (mixes) the pseudorandom noise signal (pseudorandom noise sequence) to the received signal such that the received signal is converted into a signal in an irregular form. Accordingly, it is possible that signal information with high frequency is transmitted in a low frequency band.

Further, the random signal mixer 32 may include a low-pass filter (LPF) 33 performing filtering on the resulting signal, to which the pseudorandom noise signal is applied, with a predetermined low frequency band.

FIG. 4 is a diagram illustrating in detail another example of a configuration of an ADC unit provided in the apparatus for reception shown in FIG. 1.

Referring to FIG. 4, an ADC unit 40 may include: a pseudorandom signal generator 41; a random signal mixer 42; a real-number/imaginary-number domain signal separator 43; a first low-frequency filter 44; a second low-frequency filter 45; a first ADC 46; a second ADC 47; and a multiplexer 48.

The pseudorandom signal generator 41 may generate the pseudorandom noise signal (the pseudorandom noise sequence), and the random signal mixer 42 may apply the pseudorandom signal to the received signal and may output the resulting signal to which the pseudorandom signal is applied.

The real-number/imaginary-number domain signal separator 43 may separate the resulting signal to which the pseudorandom signal is applied into a real-number domain signal and an imaginary-number domain signal. Accordingly, the first low-frequency filter 44 performs first filtering on the real-number domain signal with a predetermined low frequency band, and the first ADC 46 performs analog-to-digital conversion on the signal on which first filtering is performed with the second sampling rate, thereby generating a first analog-to-digital conversion signal. Similarly, the second low-frequency filter 45 performs second filtering on the imaginary-number domain signal with a predetermined low frequency band, and the second ADC 47 performs analog-to-digital conversion on the signal on which second filtering is performed with the second sampling rate, thereby generating a second analog-to-digital conversion signal.

Also, the multiplexer 48 multiplexes the first analog-to-digital conversion signal and the second analog-to-digital conversion signal such that an analog-to-digital conversion signal is output.

FIG. 5 is a flowchart illustrating the sequence of a method of transmitting a compressive sensing signal according to an embodiment of the present disclosure.

The method of transmitting the compressive sensing signal may be executed by the above-described apparatus for transmitting the compressive sensing signal (hereinafter, referred to as "an apparatus for transmission").

First, the apparatus for transmission applies symbol values on which sampling is performed on the basis of the first sampling rate (e.g., the Nyquist rate) to the predetermined dictionary set and constructs a modulation signal at step S501.

Here, multiple symbols may be set to a single group, and the predetermined dictionary set may be set on a per-group basis. The dictionary set may include multiple dictionary atoms. The dictionary atom may be set in consideration of the number (N, which is a natural number) of symbols provided in the group and the number (M, which is a natural number) of values that may be set as symbol values. Specifically, the number of dictionary atoms may be set to $M^N$, and each dictionary atom may be set to a combination of values of respective symbols included in the group.

For example, referring to FIG. 2, the apparatus for transmission performs modulation on the transmission signal in the QPSK scheme and sets eight symbols S0 to S7 to a single group. In this case, each symbol may have values of 00, 01, 10, and 11, and thus the number M of values that may be set as symbol values may be set to four, and the number N of symbols provided in the group may be set to eight. Therefore, the number of dictionary atoms may be set to $4^8$, and each of the dictionary atoms may have a combination of symbol values that may be set for each of the eight symbols S0 to S7. That is, the dictionary atoms may be set to have values ranging from 00 00 00 00 00 00 00 00 to 11 11 11 11 11 11 11 11.

Considering this, the dictionary set may be obtained using the above-described Equation 1.

Further, in setting the predetermined dictionary set, the number of symbols included in each group may be set in consideration of the ADC sampling rate of the apparatus for reception.

The apparatus for transmission may perform up-sampling on the signal modulated using the dictionary set at step S502, may perform root-raised-cosine (RRC) filtering on the signal, on which up-sampling is performed, at step S503, and may perform compensation for the delayed signal due to filtering at step S504, whereby the transmission signal is constructed. Conversion of the modulation signal to the transmission signal may be performed using the above-described Equation 2.

In the meantime, FIG. 6 is a flowchart illustrating a sequence of a method of receiving a compressive sensing signal according to an embodiment of the present disclosure.

The method of receiving the compressive sensing signal may be executed by the apparatus for reception of the compressive sensing signal (hereinafter, referred to as "an apparatus for reception").

The apparatus for reception may receive the signal (hereinafter, referred to as "a received signal") transmitted from the apparatus for transmission at step S601. Here, the received signal may be a signal processed using the predetermined dictionary set and the first sampling rate for each symbol group including one or more symbols.

At step S602, the apparatus for reception may perform sampling on the signal at the second sampling rate, which is lower than the first sampling rate used in modulation by the apparatus for transmission, such that analog-to-digital conversion is performed. For example, when the first sampling rate is set to the Nyquist rate, the second sampling rate is set to the sub-Nyquist rate. For example, the sub-Nyquist rate may be set to the Nyquist rate)/W (here, W is a positive integer).

Further, at step S602, before sampling, the apparatus for reception may apply the pseudorandom noise signal (pseudorandom noise sequence) to the received signal and may output the resulting signal to which the pseudorandom signal is applied. As described above, at step S602, by applying (mixing) the pseudorandom noise signal (pseudorandom noise sequence) to the received signal, the received signal is converted into a signal in an irregular form. Accordingly, it is possible that signal information with high frequency is transmitted in a low frequency band.

Also, at step S602, the apparatus for reception may perform filtering on the resulting signal, to which the pseudorandom noise signal is applied, with a predetermined low frequency band.

At step S603, the apparatus for reception may check compressed measurement information from the signal on which analog-to-digital conversion is performed. As described above, the apparatus for transmission sets multiple symbols, on which sampling is performed at the first sampling rate, to a group, and transmits a signal corresponding to the dictionary atoms by using the predetermined dictionary set for each group. Therefore, the compressed measurement information detected from the received signal may be the signal corresponding to the dictionary atoms included in the predetermined dictionary set for each group.

Considering this, at step S603, the apparatus for reception may compare the compressed measurement information with the multiple dictionary atoms included in the predetermined dictionary set, and may detect the dictionary atom having relatively high similarity. Also, the apparatus for reception may check symbol values of respective multiple symbols included in the group using information indicated by the detected dictionary atom at step S604.

For example, the apparatus for reception may calculate candidate measurement values corresponding to dictionary atoms included in the predetermined dictionary set. Also, the apparatus for reception compares the obtained candidate measurement values with the value of the compressed measurement information, and detects the candidate measurement value having relatively high similarity. Next, the apparatus for reception may check the values indicated by the dictionary atom corresponding to the detected candidate measurement value, and may map the values to values of the symbols included in the relevant group, thereby reconstructing values of the multiple symbols.

The operation of the apparatus for reception is performed using the following Equation 3.

$$y = \Phi(\psi x + n), \text{ where } \Phi = DHC \quad \text{[Equation 3]}$$

In Equation 3, the received signal is designated by $r = \psi x + a$, a matrix corresponding to the pseudorandom noise signal is designated by C, a matrix corresponding to low frequency band filtering is designated by H, and a matrix corresponding to analog-to-digital conversion using the second sampling rate is designated by D.

Further, at steps S603 and S604, the apparatus for reception may check the symbol value corresponding to the compressed measurement information using the following Equation 4.

$$\operatorname*{argmin}_{x}(y - \Phi \Psi x) \text{ s.t. } \|x\|_0 = 1, \|x\|_1 = 1 \quad \text{[Equation 4]}$$

At step S602 of the embodiment as described above, the apparatus for reception applies the pseudorandom noise signal (pseudorandom noise sequence) to the received signal, but the present disclosure is not limited thereto.

As another example, the apparatus for reception may separate the resulting signal, to which the pseudorandom signal is applied, into the real-number domain signal and the imaginary-number domain signal.

Specifically, the apparatus for reception may apply the pseudorandom signal to the received signal such that the resulting signal to which the pseudorandom signal is applied is constructed. Also, the apparatus for reception may separate the resulting signal to which the pseudorandom signal is applied into the real-number domain signal and the imaginary-number domain signal.

Accordingly, the apparatus for reception may perform first filtering on the real-number domain signal with the predetermined low frequency band, and may perform analog-to-digital conversion on the signal, on which first filtering is performed, with the second sampling rate, thereby generating the first analog-to-digital conversion signal. Similarly, the apparatus for reception may perform second filtering on the imaginary-number domain signal with the predetermined low frequency band, and may perform analog-to-digital conversion on the signal, on which second filtering is performed, with the second sampling rate, thereby generating the second analog-to-digital conversion signal. Also, the apparatus for reception multiplexes the first analog-to-digital conversion signal and the second analog-to-digital conversion signal such that the analog-to-digital conversion signal is constructed.

According to the various embodiments of the present disclosure, high sampling rate requirements of the ADC, required in signal recording, are mitigated, and thus hardware costs and the complexity of the signal recording system are reduced.

Further, by using the ADC at the low sampling rate, resolution of the ADC is increased, and sampling rate and processability of the received signal are enhanced; especially, the power required for signal recording is reduced and the size of the system is reduced.

Also, according to the various embodiments of the present disclosure, sample data is stored at a particular level required in the acquisition method based on the Nyquist sampling rate, and the signal is reconstructed from the data. Accordingly, the signal modulated on the basis of the Nyquist sampling rate is recorded at the low sampling rate, and thus analysis data required in developing various communication products (for example, satellites, mobile phones, TV, radios, GPS clocks, navigation devices, and the like) is easily obtained.

Although a preferred embodiment of the present disclosure has been described for illustrative purposes, those skilled in the art will appreciate that various modifications, additions and substitutions are possible, without departing from the scope and spirit of the disclosure as disclosed in the accompanying claims.

The exemplary methods described herein were expressed by a series of operations for clear description, but it does not limit the order of performing the steps, and if necessary, the steps may be performed simultaneously or in different orders. In order to achieve the method of the present disclosure, other steps may be added to the exemplary steps, or the other steps except for some steps may be included, or additional other steps except for some steps may be included.

Various embodiments described herein are provided to not arrange all available combinations, but explain a representative aspect of the present disclosure and the configurations about the embodiments may be applied individually or in combinations of at least two of them.

Further, various embodiments of the present disclosure may be implemented by hardware, firmware, software, or combinations thereof. When hardware is used, the hardware may be implemented by at least one of ASICs (Application Specific Integrated Circuits), DSPs (Digital Signal Processors), DSPDs (Digital Signal Processing Devices), PLDs (Programmable Logic Devices), FPGAs (Field Programmable Gate Arrays), a general processor, a controller, a micro controller, and a micro-processor.

The scope of the present disclosure includes software and device-executable commands (for example, an operating system, applications, firmware, programs) that make the method of the various embodiments of the present disclosure executable on a machine or a computer, and non-transitory computer-readable media that keeps the software or commands and can be executed on a device or a computer.

What is claimed is:

1. A method of processing a compressive sensing signal, the method comprising:
   receiving a signal processed using a predetermined dictionary set and a first sampling rate for each symbol group including one or more symbols;
   performing analog-to-digital conversion on the received signal at a second sampling rate that is lower than the first sampling rate;
   checking compressed measurement information from the signal on which analog-to-digital conversion is performed; and
   reconstructing values of the symbols included in the symbol group, which correspond to the compressed measurement information, on the basis of the predetermined dictionary set,
   wherein the performing of analog-to-digital conversion at the second sampling rate comprises:
   applying a pseudorandom signal to the received signal so as to produce a reception signal; and
   generating an analog-to-digital conversion signal by performing analog-to-digital conversion on the reception signal, to which the pseudorandom signal is applied, at the second sampling rate.

2. The method of claim 1, wherein the generating of the analog-to-digital conversion signal comprises:
   performing filtering on the reception signal, to which the pseudorandom signal is applied, with a predetermined low frequency band.

3. The method of claim 1, wherein the generating of the analog-to-digital conversion signal comprises:
   separating the reception signal, to which the pseudorandom signal is applied, into a real-number domain signal and an imaginary-number domain signal;
   performing first filtering on the real-number domain signal with a predetermined low frequency band;
   performing second filtering on the imaginary-number domain signal with a predetermined low frequency band;
   generating a first analog-to-digital conversion signal by performing analog-to-digital conversion on the signal, on which first filtering is performed, with the second sampling rate;
   generating a second analog-to-digital conversion signal by performing analog-to-digital conversion on the signal, on which second filtering is performed, with the second sampling rate; and
   generating the analog-to-digital conversion signal by multiplexing the first analog-to-digital conversion signal and the second analog-to-digital conversion signal.

4. The method of claim 1, wherein the reconstructing of the values of the symbols comprises:
   checking candidate measurement values that are combinations of symbol values for each of the symbols;
   detecting at least one candidate measurement value having relatively high similarity to the compressed measurement information from the candidate measurement values; and
   reconstructing the values of the symbols by checking symbol values corresponding to the detected candidate measurement value.

5. The method of claim 1, wherein the predetermined dictionary set is generated in consideration of the number of the symbols included in the symbol group and symbol values for each of the symbols.

6. The method of claim 1, wherein the first sampling rate is a sampling rate based on a Nyquist scheme.

7. An apparatus for processing a compressive sensing signal, the apparatus comprising:
   a signal reception unit receiving a signal processed using a predetermined dictionary set and a first sampling rate for each symbol group including one or more symbols;
   an ADC (analog-to-digital converter) unit performing analog-to-digital conversion on the received signal at a second sampling rate that is lower than the first sampling rate;

a compressed measurement information detection unit checking compressed measurement information from the signal on which analog-to-digital conversion is performed; and a compressive sensing signal reconstruction unit reconstructing values of the symbols included in the symbol group, which correspond to the compressed measurement information, on the basis of the predetermined dictionary set, wherein the ADC unit comprises;

a pseudorandom signal generator generating a pseudorandom noise signal;

a random signal mixer applying the pseudorandom signal to the received signal so as to produce a reception signal and to output the reception signal; and an AD converter generating an analog-to-digital conversion signal by performing analog-to-digital conversion on the reception signal, to which the pseudorandom signal is applied, at the second sampling rate.

8. The apparatus of claim 7, wherein the ADC unit further comprises:

a low-frequency filter performing filtering on the reception signal, to which the pseudorandom signal is applied, with a predetermined low frequency band.

9. The apparatus of claim 7, wherein the ADC unit further comprises:

a real-number/imaginary-number domain signal separator separating the reception signal, to which the pseudorandom signal is applied, into a real-number domain signal and an imaginary-number domain signal;

a first low-frequency filter performing first filtering on the real-number domain signal with a predetermined low frequency band;

a second low-frequency filter performing second filtering on the imaginary-number domain signal with a predetermined low frequency band;

a first ADC generating a first analog-to-digital conversion signal by performing analog-to-digital conversion on the signal, on which first filtering is performed, at the second sampling rate;

a second ADC generating a second analog-to-digital conversion signal by performing analog-to-digital conversion on the signal, on which second filtering is performed, at the second sampling rate; and a multiplexer outputting an analog-to-digital conversion signal by multiplexing the first analog-to-digital conversion signal and the second analog-to-digital conversion signal.

10. The apparatus of claim 7, wherein the compressive sensing signal reconstruction unit comprises:

a candidate measurement value checking unit checking candidate measurement values, which are combinations of predetermined symbol values for each of the symbols; and a symbol value reconstruction unit detecting at least one candidate measurement value having relatively high similarity to the compressed measurement information from the candidate measurement values, the symbol value reconstruction unit reconstructing the values of the symbols by checking symbol values corresponding to the detected candidate measurement value.

\* \* \* \* \*